United States Patent [19]

Saito et al.

[11] Patent Number: 4,640,961
[45] Date of Patent: Feb. 3, 1987

[54] RESIN COMPOSITION

[75] Inventors: Teruo Saito, Shiga; Kuniaki Asai, Osaka; Yasuro Suzuki, Osaka; Kei Kagiya, Osaka, all of Japan

[73] Assignee: Sumitomo Chemicial Company, Limited, Osaka, Japan

[21] Appl. No.: 748,060

[22] PCT Filed: Jan. 17, 1985

[86] PCT No.: PCT/JP85/00014
§ 371 Date: Jun. 13, 1985
§ 102(e) Date: Jun. 13, 1985

[87] PCT Pub. No.: WO85/03304
PCT Pub. Date: Aug. 1, 1985

[30] Foreign Application Priority Data

Jan. 17, 1984 [JP] Japan .................................. 59-6948

[51] Int. Cl.$^4$ .............................................. C08L 67/02
[52] U.S. Cl. ...................................... 525/444; 524/539
[58] Field of Search ......................................... 525/444

[56] References Cited

U.S. PATENT DOCUMENTS 4,267,289 5/1981 Froix .................................... 525/444
4,379,892 4/1983 Ueno .................................... 525/439
4,386,174 5/1983 Cogswell ................................ 524/27
4,414,365 11/1985 Sugimoto ............................. 525/437

Primary Examiner—Lewis T. Jacobs
Assistant Examiner—Patricia A. Short
Attorney, Agent, or Firm—Sughrue, Mion, Zinn, Macpeak & Seas

[57] ABSTRACT

A resin composition is described, comprising from 60 to 97% by weight of a heat-fusible wholly aromatic co-polyester represented by the general formula:

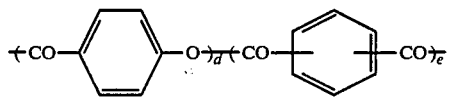

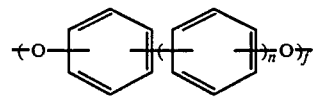

(wherein d, e, and f are not equal to O and e/f is from 0.90 to 1.10, and n is 0 or 1) and from 3 to 40% by weight of a polyarylate.

1 Claim, No Drawings

RESIN COMPOSITION

TECHNICAL FIELD

The present invention relates to a resin composition comprising a wholly aromatic copolyester and a polyarylate, capable of providing molded articles having excellent heat resistance and impact resistance and having a good appearance.

BACKGROUND ART

A heat-fusible wholly aromatic copolyester represented by the general formula:

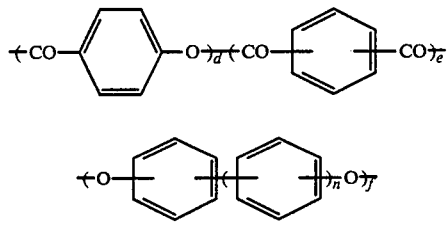

(wherein d, e, and f are not equal to 0 and e/f is from 0.90 to 1.10, and n is 0 or 1) has high heat resistance and exhibits excellent fluidity at suitable processing temperatures and thus, it is expected to find wide use in the fabrication of, for example, electric or electronic parts.

This wholly aromatic copolyester, however, has a disadvantage in that when injection molded, since its molding temperature is high, its melt viscosity varies markedly with even a slight change in molding temperature, and it readily undergoes orientation; thus it produces only molded articles having a bad appearance due to uneven flow marks. Further, in connection with the physical properties of its molded articles, they have a low impact strength and are brittle. Thus the wholly aromatic copolyester is difficult to put into practical use as a structural material even though it has excellent heat resistance.

In order to improve the appearance of molded articles, various attempts have heretofore been made. As the methods for improving the marked change of melt viscosity by the molding temperature, there is a method for blending with resins having a lower temperature dependency.

For example, a method of blending with polyethylene terephthalate or polycarbonate is such a method.

However, if the wholly aromatic copolyester is mixed with polyethylene terephthalate or polycarbonate, granulated, and molded in a temperature range where the wholly aromatic copolyester is uniformly melted, the polyethylene terephthalate or polycarbonate readily undergoes thermal decomposition. On the other hand, if they are treated in a temperature range where these resins can be melted stably, the fluidity of the wholly aromatic copolyester is not sufficient to enable the whole of the composition to become a uniform dispersion.

Further, as a method for increasing the impact strength of the molded articles, there is the method of blending with rubbers. In this case, however, the same problems as encountered in the blending with polyethylene terephthalate or polycarbonate occur.

Moreover, both the above-described methods are undesirable because they cause a serious reduction in heat resistance of the resulting molded articles.

DISCLOSURE OF THE INVENTION

As the result of extensive investigations to overcome the above-described problems, the present inventors have found that blending of a wholly aromatic copolyester with a polyarylate permits the production of a composition from which molded articles having a good appearance and a high impact strength can be produced, without causing a serious reduction in the excellent heat resistance of the wholly aromatic copolyester.

That is, the present invention relates to a resin composition comprising from 60 to 97% by weight of a wholly aromatic copolyester and from 3 to 40% by weight of a polyarylate.

The wholly aromatic copolyester that is used in the present invention is a heat-fusible wholly aromatic copolyester represented by the general formula:

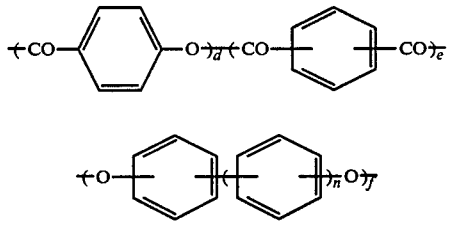

(wherein d, e, and f are not equal to 0 and e/f is from 0.90 to 1.10, and n is 0 or 1) and it is preferred that

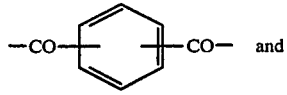 and

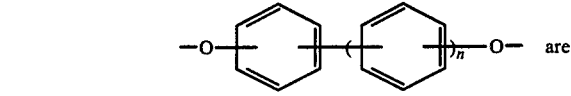 are

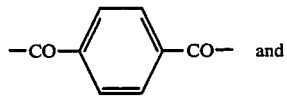 and

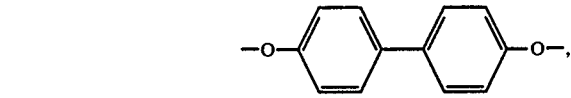, respectively and d/e is from 1.5 to 3.5 because the heat resistance is high and heat-fusibility is good. As methods for polymerization of such aromatic copolyesters there are methods as described in Japanese Patent Application Kokai Nos. 104932/81 and 44622/82, but the present invention is not intended to be limited thereto.

The polyarylate that is used in the present invention is a polyarylate prepared from a mixture of isophthalic acid or a functional derivative thereof and terephthalic acid or a functional derivative thereof and a bisphenol represented by the general formula:

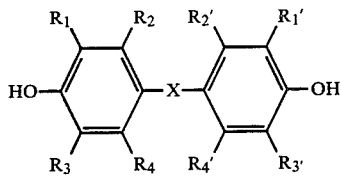

(wherein —X— is selected from the group consisting of —O—, —SO$_2$—, —CO—, —S—, an alkylene group, and an alkylidene group, and $R_1$, $R_2$, $R_3$, $R_4$, $R_1'$, $R_2'$, $R_3'$, and $R_4'$ are each selected from the group consisting of a hydrogen atom, a halogen atom, and a hydrocarbon group).

The molar ratio of terephthalic acid group to isophthalic acid group in the acid component of the polyarylate used in the present invention is from 1:9 to 9:1, preferably from 3:7 to 7:3, and more preferably about 5:5.

As the bisphenol used in the present invention, any of those represented by the general formula:

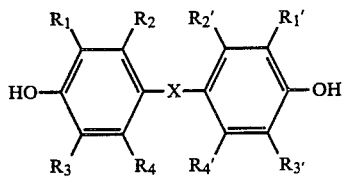

can be used.

In the above formula, —X— is selected from the group consisting of —O—, —SO$_2$—, —CO—, —S—, an alkylene group, and an alkylidene group, and $R_1$, $R_2$, $R_3$, $R_4$, $R_1'$, $R_2'$, $R_3'$, and $R_4'$ are each selected from the group consisting of a hydrogen atom, a halogen atom, and a hydrocarbon group. Examples of such bisphenols include 2,2-bis(4-hydroxyphenyl)propane, 4,4'-dihydroxy-3,3'-dimethyldiphenyl ether, 4,4'-dihydroxy-3,3'-dichlorodiphenyl ether, 4,4'-dihydroxy-diphenyl sulfide, 4,4'-dihydroxydiphenylsulfone, 4,4'-dihydroxydiphenyl ketone, bis(4-hydroxyphenyl)methane, 1,1-bis(4-hydroxyphenyl)methane, 1,1-bis(4-hydroxyphenyl)-n-butane, di(4-hydroxyphenyl)-cyclohexylmethane, 1,1-bis(4-hydroxyphenyl)-2,2,2-trichloroethane, 2,2-bis(4-hydroxy-3,5-dibromophenyl)propane, and 2,2-bis(4-hydroxy-3,5-dichlorophenyl)propane, with 2,2-bis(4-hydroxyphenyl)propane, generally called "bisphenol A", being most preferred.

As the formulation, those comprising from 60 to 97% by weight of the wholly aromatic copolyester and from 3 to 40% by weight of the polyarylate based on the sum of the wholly aromatic copolyester and polyarylate are effective.

That is, if the composition comprises 97% by weight or more of the wholly aromatic copolyester and less than 3% by weight of the polyarylate, such is not desirable because no improvement is obtained such that the impact strength is low and the appearance is not good.

Further, if the composition comprises less than 60% by weight of the wholly aromatic copolyester and 40% by weight or more of the polyarylate, such is not desirable because the excellent heat resistance which is a characteristic of the wholly aromatic copolyester is greatly lost.

Those compositions comprising from 70 to 95% by weight of the wholly aromatic copolyester and from 5 to 30% by weight of the polyarylate are preferable because the above-described improving effects are remarkable.

The composition of the present invention is not particularly limited with respect to blending means. The wholly aromatic copolyester and polyarylate may be supplied independently to a melt mixer, or may be preliminarily mixed with each other by means of a Henschel mixer, a ball mill, or a ribbon blender and then supplied to the melt mixer.

One or more of commonly used additives such as antioxidants, heat stabilizers, ultraviolet light absorbers, lubricants, releasing agents, coloring agents such as dyes and pigments, flame retardants, auxiliary flame retardants, and antistatic agents can be added to the composition of the present invention so far as the objects of the present invention are not impaired.

In addition, suitable amounts of fillers and reinforcing materials such as clay, mica, talc, silica, graphite, glass beads, alumina, calcium carbonate, glass fiber, carbon fiber, and potassium titanate fiber can be added thereto depending on the purpose.

BEST MODE FOR PRACTICING THE INVENTION

The present invention is described in greater detail with reference to the following examples, but it is to be noted that these examples are given to illustrate preferred embodiments and the invention is not limited to the compositions thereof.

EXAMPLES 1 TO 3

A wholly aromatic copolyester represented by the formula:

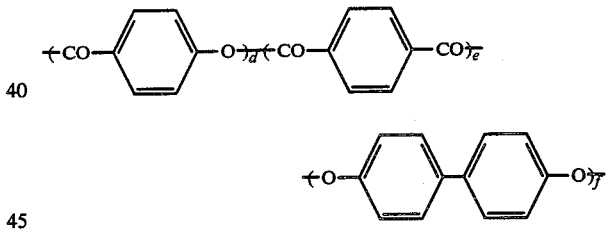

(wherein d/e/f is 2/1/1) and a polyarylate (U Polymer, U-100, produced by Unitika Ltd.) represented by the formula:

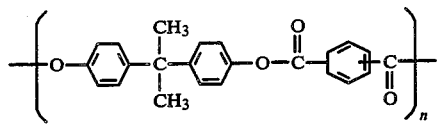

were mixed in a formulation ratio as shown in Table 1 and extrusion granulated at a temperature of 360° C. using a twin screw extruder (Model PCM-30, manufactured by Ikegai Iron Works Ltd.) to obtain pellets. The pellets were molded under conditions of cylinder temperature of 380° C., injection pressure of 1,500 kg/cm$^2$, high injection speed, and mold temperature of 120° C. using a 1 oz injection molding machine (Model Neomat 47/28, manufactured by Sumitomo Heavy Industries, Ltd.) to produce a test specimen for examination of the appearance, a test specimen for measurement of heat distortion temperature, and a test specimen for Izod impact test (thickness: 3.2 mm).

The heat distortion temperature and Izod impact strength were measured according to ASTM-D-648 and ASTM-D-256, respectively.

The results are shown in Table 1.

It can be seen from the table that the composition of the present invention exhibits great improvements in appearance and impact strength.

The heat resistance is slightly inferior to that of the wholly aromatic copolyester but is sufficiently high.

COMPARATIVE EXAMPLES 1 TO 3

With respect to each of a composition composed of a wholly aromatic copolyester alone and compositions containing a polyarylate having a formulation ratio outside the effective range of the examples, the same evaluation was performed. The results are shown in Table 1.

In the wholly aromatic copolyester alone (Comparative Example 1) and the system where the ratio of the polyarylate was 1.5% by weight (Comparative Example 2), the impact strength was undesirably low and the appearance was undesirably bad.

Further, in the system where the ratio of the polyacylate was 50% by weight (Comparative Example 3), the heat resistance was seriously decreased.

TABLE 1

| | Formulation Ratio (wt %) | | | | Heat Distortion Temperature*** (°C.) |
|---|---|---|---|---|---|
| | Wholly Aromatic Copolyester | Polyarylate | Appearance* | Impact Strength** | |
| Example 1 | 95 | 5 | A | 25 | 290 |
| Example 2 | 80 | 20 | A | 40 | 270 |
| Example 3 | 70 | 30 | A | 25 | 250 |
| Comparative Example 1 | 100 | 0 | C | 12 | 300 |
| Comparative Example 2 | 98.5 | 1.5 | B | 12 | 295 |
| Comparative Example 3 | 50 | 50 | B | 12 | 170 |

Note:
*Rating scale for appearance:
A: Almost no flow marks; the surface is smooth.
B: Although there are slight flow marks, the surface is good.
C: There are a number of flow marks, and the surface is uneven.
**Impact Strength: Not notched; thickness: 3.2 mm (kg · cm/cm)
***Heat distortion temperature: Measured under a load of 18.6 kg.

What is claimed is:

1. A resin composition comprising from 60 to 97% by weight of a heat-fusible wholly aromatic copolyester consisting of a copolyester represented by the formula:

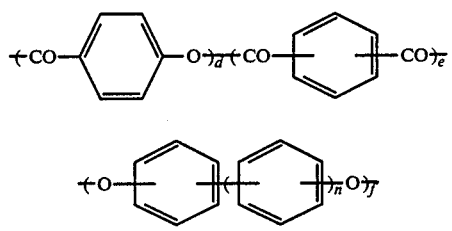

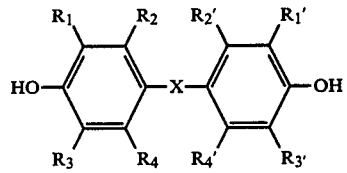

wherein d, e, and f are not equal to O and e/f is from 0.90 to 1.10, and n is 0 or 1 and from 3 to 40% by weight of a polyarylate prepared from a mixture consisting of isophthalic acid or a functional derivative thereof and terephathalic acid or a functional derivative thereof and a bisphenol represented by the formula:

$$\text{HO}\underset{R_3}{\overset{R_1}{\diagdown}}\text{-X-}\underset{R_4'}{\overset{R_2'}{\diagdown}}\text{-OH}$$

wherein —X— is selected from the group consisting of —O—, —SO$_2$—, —CO—, —S—, an alkylene group, and an alkylidene group, and R$_1$, R$_2$, R$_3$, R$_4$, R$_1'$, R$_2'$, R$_3'$, and R$_4'$ are each selected from the group consisting of a hydrogen atom, a halogen atom, and a hydrocarbon group.

* * * * *